3 Sheets—Sheet 1.

M. S. WALKINS.
Running-Gear.

No. 7,467. Patented June 25, 1850.

3 Sheets—Sheet 2

M. S. WALKINS.
Running-Gear.

No. 7,467. Patented June 25, 1850.

M. S. WALKINS.
Running-Gear.

No. 7,467.

3 Sheets—Sheet 3.

Patented June 25, 1850.

UNITED STATES PATENT OFFICE.

MILES S. WATKINS, OF SOMERVILLE, TENNESSEE.

CARRIAGE.

Specification of Letters Patent No. 7,467, dated June 25, 1850.

*To all whom it may concern:*

Be it known that I, MILES S. WATKINS, of Somerville, in the county of Fayette and State of Tennessee, have invented certain new and useful Improvements in the Construction of Buggies and other Vehicles; and I do hereby declare the following to be a full and clear description thereof, reference being had to the accompanying drawings, making a part of this specification.

In the construction of buggies and other vehicles in the manner and after the style hereinafter described, a great desideratum is attained, namely, a vehicle composed entirely of metal so as to combine lightness, strength, durability and beauty; each axle-tree being in the form of an ellipse, within which are confined the common elliptical springs.

Figure 1:
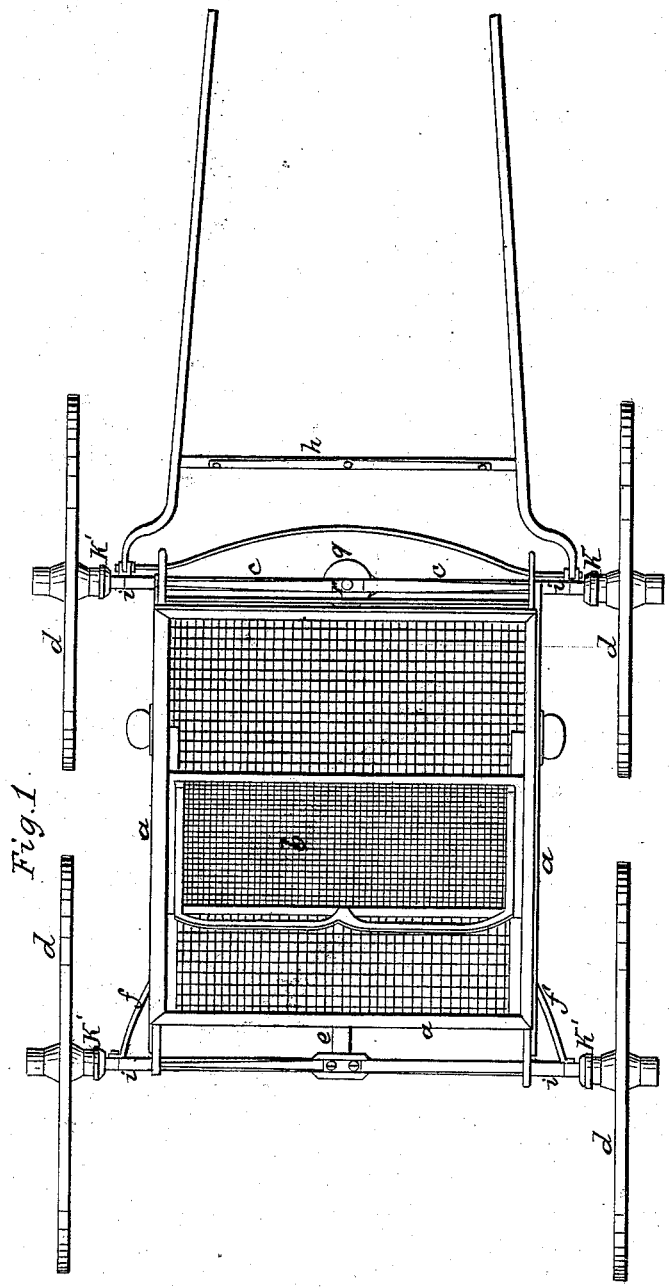
Figure 2:
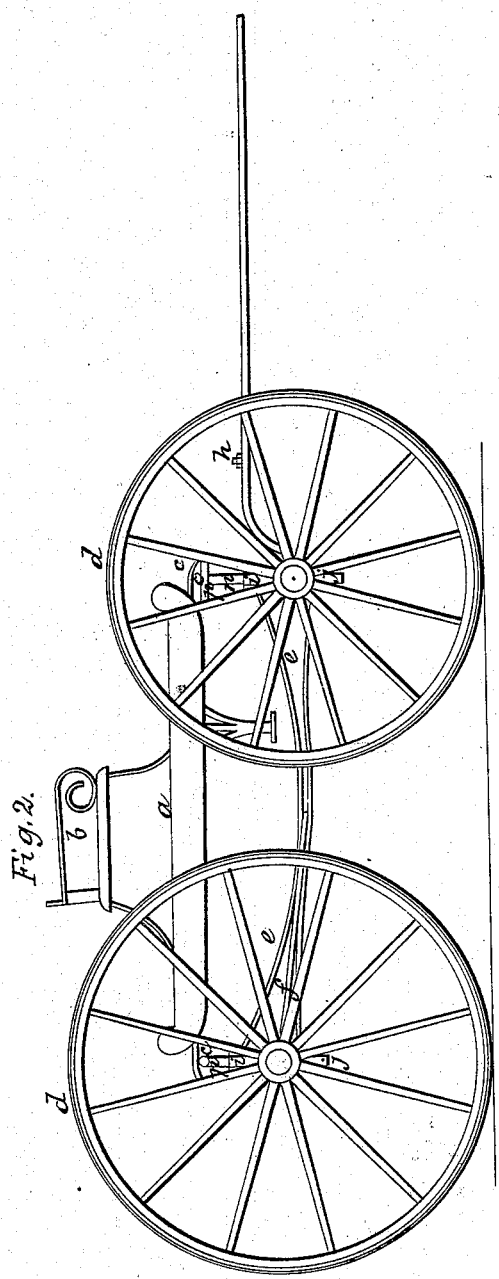
Figure 3:
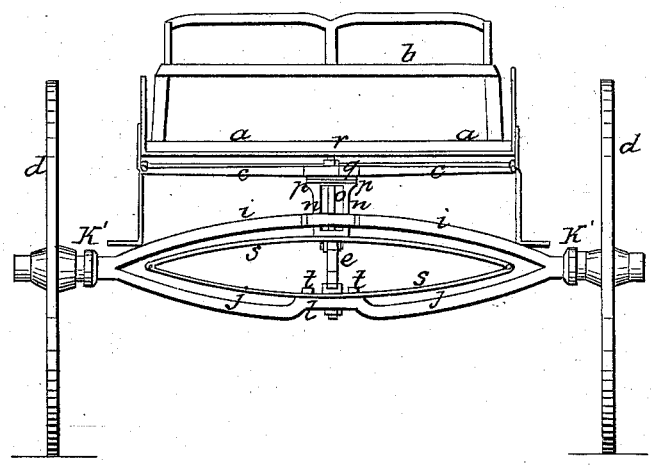
Figure 4:
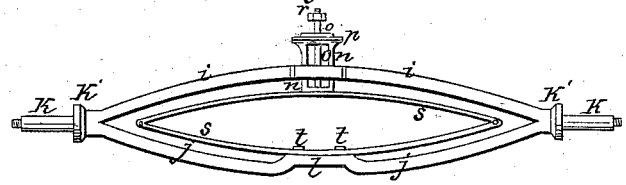
Figure 5:

In the annexed drawings, Figure 1, represents a plan or top view of a buggy. Fig. 2, is an elevation of the side thereof. Fig. 3, is a front elevation, the shafts being removed. Fig. 4, is an elevation showing the front axle-tree, spring, and sliding frame. Fig. 5, is a top view of the axle-tree.

Similar letters in the several figures refer to corresponding parts.

The body ($a$) is composed of metallic plates, securely connected to each other; the floor of which being made of strong wire and confined to the frame. $b$ is the seat, also composed of metallic plates, and wire, and mounted in the usual way upon the body. $c$, $c$, are two bars which support the body of the buggy running parallel with the axle-tree, and directly over the same. The wheels $d$, $d$, are constructed entirely of iron in such manner as to render them very light and symmetrical, and at the same time possessing great strength; the hubs of which are made of wrought iron, and provided with as many round holes, having screw threads cut therein, as there are to be spokes, into which are to be screwed the ends of small elastic wrought iron spokes, tapering from the hub to the rim in the usual manner. The circular rim or endless felly is to be cast solid, of iron, subsequently rendered malleable in the form of the letter T in its cross section, the tail being centerward; over which rim the usual wrought iron tire is to be secured, by heating and shrinking. The spokes being made of wrought iron, may be easily bent and inserted into holes in the rim and secured therein. ($e$) is the spring perch, or reach, connecting the fore and rear axle-trees; $f$, curved brace. $g$, $g$, are the shafts attached in the usual manner. $h$, is the swingle-tree, all of which are made of metal.

The distinguishing feature of my improvement consists in the peculiar construction of the axle-tree. This is composed of two bars of iron $i$, $j$, each forming the half of an ellipse, and meeting far enough from the ends to form, when welded together, the spindles $k$, of the axle-tree, and circular shoulders $k'$ $k'$, against which the hubs of the wheels revolve. The bar $j$ forming the lower semi-ellipse is raised in the middle thereof, high enough to form a seat $l$, and give the spring which is to rest upon it sufficient play; or allow of its full contraction.

In the middle of the bar $i$ forming the upper semi-ellipse which is increased in width, there is made an oblong opening or mortise $m$ for the purpose of receiving an oblong slotted frame or open rectangular bar $n$ and permit it to move vertically, as the body of the vehicle rises or falls. This oblong slotted frame $n$ rests upon, and is attached to the spring by a vertical central rod ($o$) and its upper end is provided with an open circular plate ($p$), upon, and against which, a similar plate $q$, fits, which compose what is sometimes denominated the fifth wheel of the carriage and is attached to the center of one of the transverse bars ($c$) secured to, and supporting the body of the vehicle, the vertical central rod ($o$) extending up through the slotted frame $n$ and supporting bar ($c$) to receive a confining nut or bur ($r$).

The elliptical springs $s$, $s$, are made in the usual manner and form, and secured to the raised portion ($l$) of the lower semi-elliptical bar ($j$) by screw bolts ($t$, $t$,) and to the lower end of the slotted frame $n$, which is made to project through the oblong mortise or opening ($m$) in the upper semi-elliptical bar, for that purpose. Thus it will be seen, that this peculiarly constructed axle-tree, combines the qualities of beauty, strength, and durability, and forms an open frame, $i$ $j$, in which the elliptical spring $s$ contracts and expands with the motion of the body of the buggy; and in connection with this, the peculiar attachment of the springs $s$, to the body of the vehicle by means of the rising and falling slotted frames ($n$) acts as a brace to the same, and prevents any lateral movement, which so often breaks, or otherwse injures the springs.

The spring confined within the rear axle-tree, is attached directly to the supporting bar, by the vertical oblong slotted frame, by two screw-bolts.

The wheels are to be fitted on the spindles of the axle-trees within an inch or two of the terminus of the ellipse, against the shoulders $k'$, $k'$.

Having thus described the construction of my improvements in wheeled vehicles, what I claim as my invention, and desire to secure by Letters Patent is,

The combination of the open elliptical axle-tree ($i\ j$) with the sliding slotted frame ($n$) attached to the body of the vehicle, and passing through the upper half of the axle-tree, and attached to the upper leaf of the elliptical spring placed inside of the axle-tree, the lower leaf of said spring being secured to the inner side of the lower half of the axle-tree, the several parts being arranged and operating in the manner and for the purpose herein fully set forth.

In testimony whereof I have hereunto signed my name before two subscribing witnesses.

MILES S. WATKINS.

Witnesses:
ARMON DAVIS,
PETER L. FERGUSON.